(12) United States Patent
Takahashi et al.

(10) Patent No.: US 10,758,821 B2
(45) Date of Patent: Sep. 1, 2020

(54) OPERATION INPUT SYSTEM, OPERATION INPUT DEVICE, AND GAME SYSTEM FOR ADJUSTING FORCE FEEDBACK CONTROL

(71) Applicants: BANDAI NAMCO Entertainment Inc., Tokyo (JP); BANDAI NAMCO Studios Inc., Tokyo (JP)

(72) Inventors: Tsuyoshi Takahashi, Tokyo (JP); Toru Takahashi, Tokyo (JP)

(73) Assignees: BANDAI NAMCO ENTERTAINMENT INC., Tokyo (JP); BANDAI NAMCO STUDIOS INC., Tokyo (JP)

( * ) Notice: Subject to any disclaimer, the term of this patent is extended or adjusted under 35 U.S.C. 154(b) by 8 days.

(21) Appl. No.: 16/184,595

(22) Filed: Nov. 8, 2018

(65) Prior Publication Data

US 2019/0143205 A1    May 16, 2019

(30) Foreign Application Priority Data

Nov. 10, 2017    (JP) .................................. 2017-217228

(51) Int. Cl.
| | | |
|---|---|---|
| A63F 13/285 | (2014.01) | |
| A63F 13/23 | (2014.01) | |
| A63F 13/24 | (2014.01) | |
| A63F 13/424 | (2014.01) | |
| A63F 13/77 | (2014.01) | |

(52) U.S. Cl.
CPC ............ *A63F 13/285* (2014.09); *A63F 13/23* (2014.09); *A63F 13/24* (2014.09); *A63F 13/424* (2014.09); *A63F 13/77* (2014.09)

(58) Field of Classification Search
CPC .......... A63F 13/285; A63F 13/24; A63F 13/23
See application file for complete search history.

(56) References Cited

U.S. PATENT DOCUMENTS

| | | |
|---|---|---|
| 6,679,776 B1 | 1/2004 | Nishiumi et al. |
| 10,198,074 B2 * | 2/2019 | Grant .................... A63F 13/211 |
| 2001/0016517 A1 | 8/2001 | Nishiumi et al. |
| 2001/0016518 A1 | 8/2001 | Nishiumi et al. |
| 2016/0066295 A1 | 3/2016 | Han et al. |
| 2016/0187987 A1 | 6/2016 | Ullrich et al. |
| 2016/0321880 A1 | 11/2016 | Hamam et al. |
| 2016/0361627 A1 | 12/2016 | Fujita et al. |
| 2016/0361632 A1 | 12/2016 | Fujita et al. |

(Continued)

FOREIGN PATENT DOCUMENTS

| | | |
|---|---|---|
| EP | 3103528 A2 | 12/2016 |
| EP | 3 147 757 A1 | 3/2017 |

(Continued)

OTHER PUBLICATIONS

Jun. 27, 2019 Extended European Search Report issued in European Patent Application No. 18205195.3.

*Primary Examiner* — Chase E Leichliter
(74) *Attorney, Agent, or Firm* — Oliff PLC

(57) ABSTRACT

A game system configured to change game control and change control of perceived vibration to be fed back to a player via a first controller and a second controller, between a mounted state in which the first controller and the second controller are mounted to a gaming console and an unmounted state in which the first controller and the second controller are detached from the gaming console.

20 Claims, 6 Drawing Sheets

(56) References Cited

U.S. PATENT DOCUMENTS

| | | |
|---|---|---|
| 2016/0361633 A1 | 12/2016 | Fujita et al. |
| 2016/0361640 A1 | 12/2016 | Iwao et al. |
| 2016/0361641 A1 | 12/2016 | Koizumi et al. |
| 2017/0052750 A1 | 2/2017 | Koizumi et al. |
| 2017/0072304 A1 | 3/2017 | Koizumi et al. |
| 2017/0128830 A1 | 5/2017 | Fujita et al. |
| 2017/0136352 A1 | 5/2017 | Fujita et al. |
| 2017/0136353 A1 | 5/2017 | Koizumi et al. |
| 2017/0136354 A1* | 5/2017 | Yamano .................... G06F 3/16 |
| 2017/0144062 A1 | 5/2017 | Iwao et al. |
| 2017/0242486 A1* | 8/2017 | Grant .................... A63F 13/211 |
| 2017/0282061 A1 | 10/2017 | Fujita et al. |
| 2017/0361223 A1* | 12/2017 | Gohara ................ A63F 13/803 |
| 2018/0164896 A1 | 6/2018 | Ullrich et al. |
| 2018/0178114 A1* | 6/2018 | Mizuta ................ G07F 17/3218 |
| 2018/0178119 A1* | 6/2018 | Mizuta .................. A63F 13/211 |
| 2018/0178120 A1* | 6/2018 | Kyuma ................... A63F 13/92 |
| 2018/0178121 A1* | 6/2018 | Yamashita ............. A63F 13/92 |
| 2018/0193734 A1* | 7/2018 | Gohara ................ A63F 13/235 |
| 2018/0193735 A1* | 7/2018 | Gohara .................. A63F 13/56 |
| 2018/0193736 A1* | 7/2018 | Gohara .................. A63F 13/92 |
| 2018/0243647 A1 | 8/2018 | Komori et al. |
| 2018/0345130 A1* | 12/2018 | Wells ...................... A63F 13/92 |
| 2019/0001233 A1* | 1/2019 | Terui ...................... A63F 13/95 |
| 2019/0015744 A1* | 1/2019 | Ueda .................... A63F 13/285 |
| 2019/0232159 A1* | 8/2019 | Wells ...................... A63F 13/22 |

FOREIGN PATENT DOCUMENTS

| | | | |
|---|---|---|---|
| EP | 3 208 692 A1 | 8/2017 | |
| EP | 3208692 A1 * | 8/2017 | ............ A63F 13/211 |
| JP | 3655438 B2 | 6/2005 | |
| JP | 2016-123075 A | 7/2016 | |
| JP | 2016-212858 A | 12/2016 | |
| JP | 2017-000757 A | 1/2017 | |
| JP | 2017-148526 A | 8/2017 | |
| JP | 2017-209503 A | 11/2017 | |
| WO | 2016/136934 A1 | 9/2016 | |

* cited by examiner

OPERATION INPUT SYSTEM, OPERATION INPUT DEVICE, AND GAME SYSTEM FOR ADJUSTING FORCE FEEDBACK CONTROL

Japanese Patent Application No. 2017-217228, filed on Nov. 10, 2017, is hereby incorporated by reference in its entirety.

BACKGROUND OF THE INVENTION

The present invention relates to an operation input system, an operation input device used when executing a game, and a game system.

Conventionally, in input devices which include an operating section such as arrow keys, an input button, a joystick, or a touch panel and which accept an operation input by a player to a game device, an increasing number of input devices are equipped with a function for providing a user with feedback using haptic sense such as force feedback, tactile sensation, and heat.

In particular, recently, input devices having a built-in vibrating source cartridge and having a function for providing a player with force feedback are available (for example, Japanese Patent No. 3655438).

Meanwhile, recently, modes have emerged in which an input device mounted to a game device body is made readily attachable/detachable (for example, JP-A-2017-000757) to enable operation input in accordance with games of various types and to provide new games.

However, in the input device described in Japanese Patent No. 3655438, since a force feedback that can be fed back is monotonous, further improvement is desired to achieve feedback of fine touch through complex vibrations.

In addition, in order to provide the feedback for fine touch to the input device described in JP-A-2017-000757, a need arises to construct a system that takes a mounted state and an unmounted state with respect to a game device body into consideration.

SUMMARY

The invention can provide an operation input device capable of executing force feedback control which differs between when mounted to a body that outputs sound such as a game device body and when unmounted from the body and improving comfortability of a player when executing a game.

According to a first aspect of the invention, there is provided an operation input system used in a game, the operation input system including:

a body attachably/detachably mounted to a support;
a vibrator that vibrates the body based on a given signal;
an attachment that attachably/detachably mounts the body to the support; and
a controller that controls vibration of the vibrator in accordance with a mounted/unmounted state indicating either a mounted state in which the body is mounted to the support or an unmounted state in which the body is detached from the support.

According to a second aspect of the invention, there is provided an operation input device used in a game, the operation input device including:

a body attachably/detachably mounted to a support;
a vibrator that vibrates the body based on a given signal; and
an attachment that attachably/detachably mounts the body to the support, the vibrator being controlled in accordance with a mounted/unmounted state indicating either a mounted state in which the body is mounted to the support or an unmounted state in which the body is detached from the support.

According to a third aspect of the invention, there is provided a game system including:

a game control device that is formed on a support and controls a game; and
an operation input device that is formed on a body attachably/detachably mounted to the support,
the operation input system including:
a vibrator that vibrates the body based on a given signal; and
an attachment that attachably/detachably mounts the body to the support, and
either the game control device or the operation input device being provided with:
a detector that detects a mounted/unmounted state indicating either a mounted state in which the body is mounted to the support or an unmounted state in which the body is detached from the support; and
a controller for controlling vibration of the vibrator in accordance with the detected mounted/unmounted state.

According to a fourth aspect of the invention, there is provided a game system including:

a support;
a game control device that controls a game; and
an operation input device that is formed on a body attachably/detachably mounted to the support,
the operation input system including:
a vibrator that vibrates the body based on a given signal; and
an attachment that attachably/detachably mounts the body to the support, and
one of the support, the game control device, and the operation input device being provided with:
a detector for detecting a mounted/unmounted state indicating either a mounted state in which the body is mounted to the support or an unmounted state in which the body is detached from the support; and
a controller for controlling vibration of the vibrator in accordance with the detected mounted/unmounted state.

Figure 1:
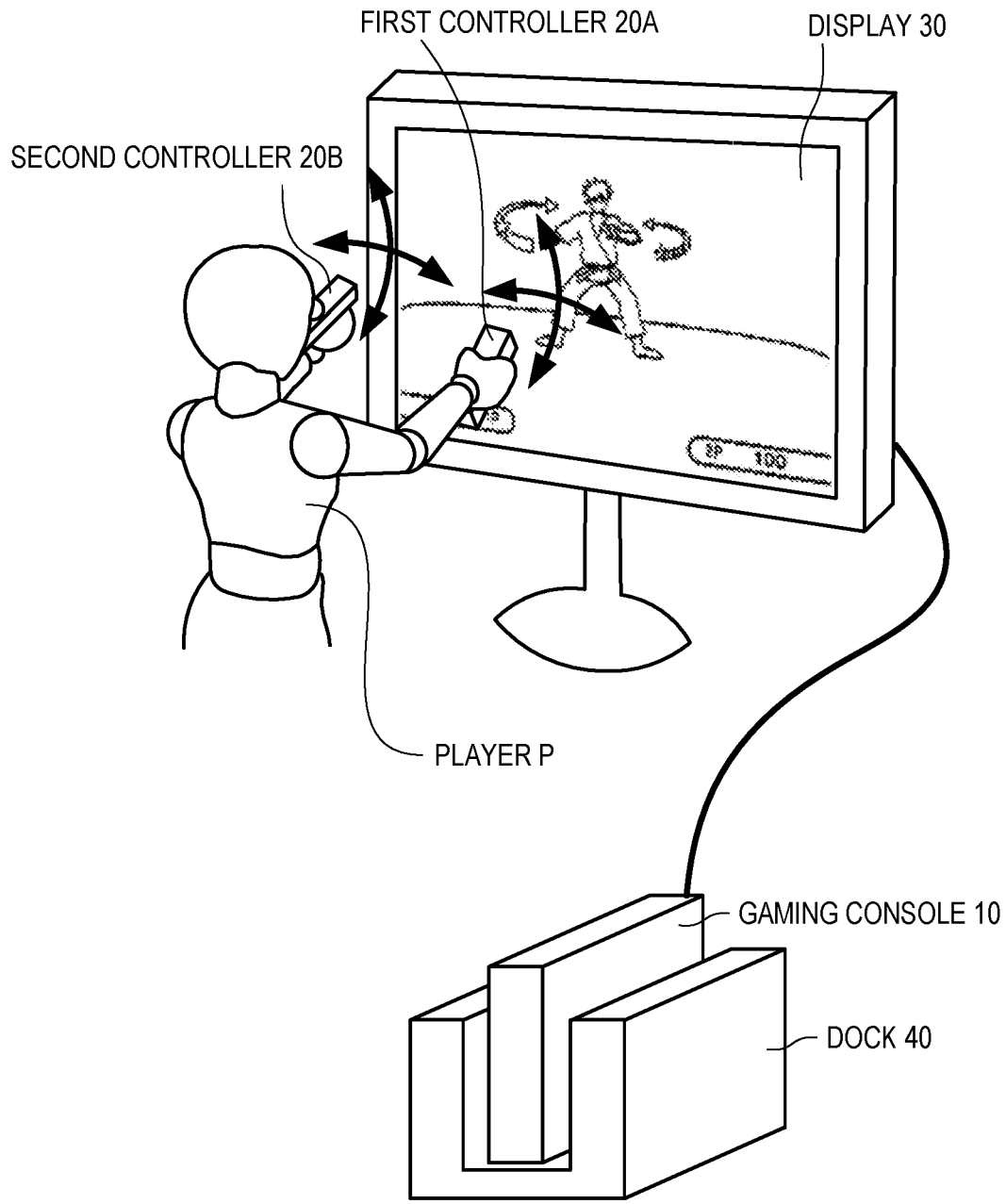
FIG. 1 is a diagram illustrating an example of an external appearance of a game system (a first mode) according to one embodiment of the invention.

DETAILED DESCRIPTION OF THE EMBODIMENTS (1) According to one embodiment of the invention, there is provided an operation input system used in a game, the operation input system including:

a body attachably/detachably mounted to a support;

a vibrator that vibrates the body based on a given signal;

an attachment for attachably/detachably mounting the body to the support; and a controller for controlling vibration of the vibrator in accordance with a mounted/unmounted state indicating either a mounted state in which the body is mounted to the support or an unmounted state in which the body is detached from the support.

According to this configuration, since the operation input system can control a vibration of the vibrator in accordance with a mounted/unmounted state such as a mounted state or an unmounted state of the body with respect to the support, for example, vibration output can be reduced by reducing the vibration width, reducing a vibration frequency, or using a vibration pattern with a smaller vibration width or a lower vibration frequency when the body is mounted to the support as compared to when the body is detached from the support (in other words, when unmounted), and performance related to vibration (hereinafter, also referred to as "perceived vibration") to be perceived by the player can be changed between when the body is mounted to the support and when the body is detached from the support.

In particular, by controlling the vibration width, the vibration frequency, and the vibration pattern based on each of a plurality of axes (vibration axes indicating a plurality of vibration directions such as front and rear, up and down, and left and right) of the vibrator such as HD vibration (HD haptics), perceived vibrations that enable an operating player to enjoy various sensations can be realized as a whole.

In addition, the operation input system described above can:

(a) when mounted, reduce force feedbacks (for example, only vibrations at a target frequency) which cause resonance vibration of the support without limiting game performance;

(b) when unmounted, execute force feedback control that ignores the resonance vibration;

(c) when unmounted, realize force feedback control in accordance with a shape of only a body; and (d) when unmounted, realize force feedback control by adopting an operation method, a performance method, or the like of the game which differs from when mounted.

Therefore, the operation input system described above can execute performance control in accordance with various situations during the execution of the game and, at the same time, since a failure based on force feedback such as generation of noise can be prevented, the operation input system described above can improve comfortability of operations while enhancing interest of a player toward the game.

It should be noted that the "body" may be a single object or may be two or more objects. When there is a single body, the body need only be mountable to any one of above, below, left, and right of the support, and when the body is provided in plurality, for example, each body is mounted so as to sandwich the support.

In addition, for example, the "unmounted state" may refer to a state in which the body is completely separated from the support and, when there are a plurality of body, the plurality of body may be coalesced into one and each body may be separated from the support.

Furthermore, the "support" may be a game device which controls a game based on an input operation instruction of a player of the game device, a communication terminal device, or the like (for example, a game device equipped with a performance function which realizes game performance including audio and video such as a display screen, a speaker, or the like) or, for example, an object for fixing a single body or a plurality of body in order to improve operability during the game.

In particular, when the "support" is a game device, game performance may or may not be changed in accordance with a mounted/unmounted state.

In addition to the above, for example, "detection of a mounted/unmounted state" may involve a physical switch provided on the body or the support or may involve photo-detection using infrared light or laser light or detection using short-range wireless communication, and "detection of a mounted/unmounted state" is not particularly limited as long as the mounted/unmounted state of the body with respect to the support can be detected.

(2) In the operation input system described above, in the case of the mounted state, the controller may control vibration of the vibrator based on, as the given signal, a force feedback control signal that differs from a signal used in the case of the unmounted state.

Since the operation input system described above can change a signal for controlling the vibrator between when the body is mounted to the support and when the body is unmounted from the support, vibration output of the vibrator when the body is mounted can be reduced as compared to the vibration when the body is unmounted by reducing the vibration width, reducing the vibration frequency, or using a vibration pattern with a smaller vibration width or a lower vibration frequency, or performance related to perceived vibration to be perceived by the player can be changed between when the body is mounted to the support and when the body is detached from the support.

In particular, by using a vibrator having a plurality of axes (vibration axes indicating a plurality of vibration directions such as front and rear, up and down, and left and right) of the vibrator such as HD vibration (HD haptics), vibration based on a sound signal which increases a possibility of resonance of the support or a device mounted to the support can be controlled by using a force feedback control signal for reducing such vibration.

(3) In the operation input system described above, the controller may control vibration of the vibrator based on, as the given signal, a sound signal of a predetermined frequency range that differs from a signal used in the case of the unmounted state, or a sound signal of a predetermined part constituting a sound.

According to this configuration, since the operation input system described above can change the signal between when the body is mounted to the support and when the body is unmounted from the support, vibration output of the vibrator when the body is mounted can be reduced as compared to the vibration when the body is unmounted by reducing the vibration width, reducing the vibration frequency, or using a vibration pattern with a smaller vibration width or a lower vibration frequency, or performance related to perceived vibration to be perceived by the player can be changed between when the body is mounted to the support and when the body is detached from the support.

In particular, by using a vibrator having a plurality of axes (vibration axes indicating a plurality of vibration directions such as front and rear, up and down, and left and right) of the vibrator such as HD vibration (HD haptics), vibration based on a sound signal which increases a possibility of resonance of the support or a device mounted to the support can be controlled by using a sound signal with a limited frequency range for reducing the vibration or a signal of a limited part of a sound.

A "sound signal of a predetermined part constituting a sound" includes, for example, a sound of a predetermined frequency range that constitutes a sound, a sound of a predetermined musical instrument, and when a sound is constituted by a plurality of channels, a sound of a predetermined channel.

(4) In the operation input system described above, in the case of the unmounted state, the controller may control vibration of the vibrator based on, as the given signal, a sound signal of an entire frequency range.

According to this configuration, by using a vibrator having a plurality of axes (vibration axes indicating a plurality of vibration directions such as front and rear, up and down, and left and right) of the vibrator such as HD vibration (HD haptics), the operation input system described above can precisely provide the player with perceived vibration having a sense of unity with a sound signal in the case of the unmounted state.

(5) According to one embodiment of the invention, there is provided an operation input device used in a game, the operation input device including:

a body attachably/detachably mounted to a support;

a vibrator that vibrates the body based on a given signal; and an attachment that attachably/detachably mounts the body to the support, the vibrator being controlled in accordance with a mounted/unmounted state indicating either a mounted state in which the body is mounted to the support or an unmounted state in which the body is detached from the support.

According to this configuration, since the operation input device can control a vibration pattern or a vibration width of the vibrator in accordance with a mounted/unmounted state such as a mounted state or an unmounted state of the body with respect to the support, for example, vibration output can be reduced by reducing the vibration width, reducing the vibration frequency, or using a vibration pattern with a smaller vibration width or a lower vibration frequency when the body is mounted to the support as compared to when the body is detached from the support, and performance related to a perceived vibration to be perceived by the player can be changed between when the body is mounted to the support and when the body is detached from the support.

(6) According to one embodiment of the invention, there is provided a game system including:

a game control device that is formed on a support and controls a game; and an operation input device that is formed on a body attachably/detachably mounted to the support, the operation input device including:

a vibrator which vibrates the body based on a given signal; and an attachment that attachably/detachably mounts the body to the support, and either the game control device or the operation input device being provided with:

a detector for detecting a mounted/unmounted state indicating either a mounted state in which the body is mounted to the support or an unmounted state in which the body is detached from the support; and a controller for controlling vibration of the vibrator in accordance with the detected mounted/unmounted state.

According to this configuration, since the game system can control a vibration pattern or a vibration width of the vibrator in accordance with a mounted/unmounted state such as a mounted state or an unmounted state of the body with respect to the support, for example, vibration output can be reduced by reducing the vibration width, reducing the vibration frequency, or using a vibration pattern with a smaller vibration width or a lower vibration frequency when the body is mounted to the support as compared to when the body is detached from the support, and performance related to a perceived vibration to be perceived by the player can be changed between when the body is mounted to the support and when the body is detached from the support.

(7) According to one embodiment of the invention, there is provided a game system including:

a support;

a game control device that controls a game; and an operation input device that is formed on a body attachably/detachably mounted to the support, the operation input device including:

a vibrator that vibrates the body based on a given signal; and an attachment for attachably/detachably mounts the body to the support, and one of the support, the game control device, and the operation input device being provided with:

a detector for detecting a mounted/unmounted state indicating either a mounted state in which the body is mounted to the support or an unmounted state in which the body is detached from the support; and a controller for controlling vibration of the vibrator in accordance with the detected mounted/unmounted state.

According to this configuration, since the game system can control a vibration pattern or a vibration width of the vibrator in accordance with a mounted/unmounted state such as a mounted state or an unmounted state of the body with respect to the support, for example, vibration output can be reduced by reducing the vibration width, reducing the vibration frequency, or using a vibration pattern with a smaller vibration width or a lower vibration frequency when the body is mounted to the support as compared to when the body is detached from the support, and performance related to a perceived vibration to be perceived by the player can be changed between when the body is mounted to the support and when the body is detached from the support.

(8) In the game system described above, the detector may include a physical switch which is formed in at least one of the support and the body and which detects the mounted/unmounted state.

According to this configuration, since the game system can physically detect the mounted/unmounted state, the game system can be constructed by a simple configuration and can reliably detect the mounted/unmounted state.

(9) In the game system described above, the detector may electrically detect the mounted/unmounted state.

According to this configuration, since the game system can electrically or optically detect the mounted/unmounted state, the game system does not have a physical structure and robustness in use can be improved.

(10) The game system described above may further include:

A display controller that causes display to display whether control of vibration of the vibrator is control in the mounted state or control in the unmounted state.

According to this configuration, since the game system can make the player aware of whether a current state is a mounted state or an unmounted state, comfortability of operations can be improved.

Hereinafter, embodiments will be described below. Note that the following embodiments do not unduly limit the scope of the invention as stated in the claims. In addition, all of the elements described in connection with the following embodiments should not necessarily be taken as essential requirements of the invention.

1. Overview of Game System

First, an overview and a general configuration of a game system 1 according to one embodiment of the invention will be described with reference to FIGS. 1 and 2. FIG. 1 is a diagram (a first mode) illustrating a schematic appearance of a game system 1 and FIG. 2 is a diagram (a second mode) illustrating a schematic appearance of the game system 1.

Figure 2:
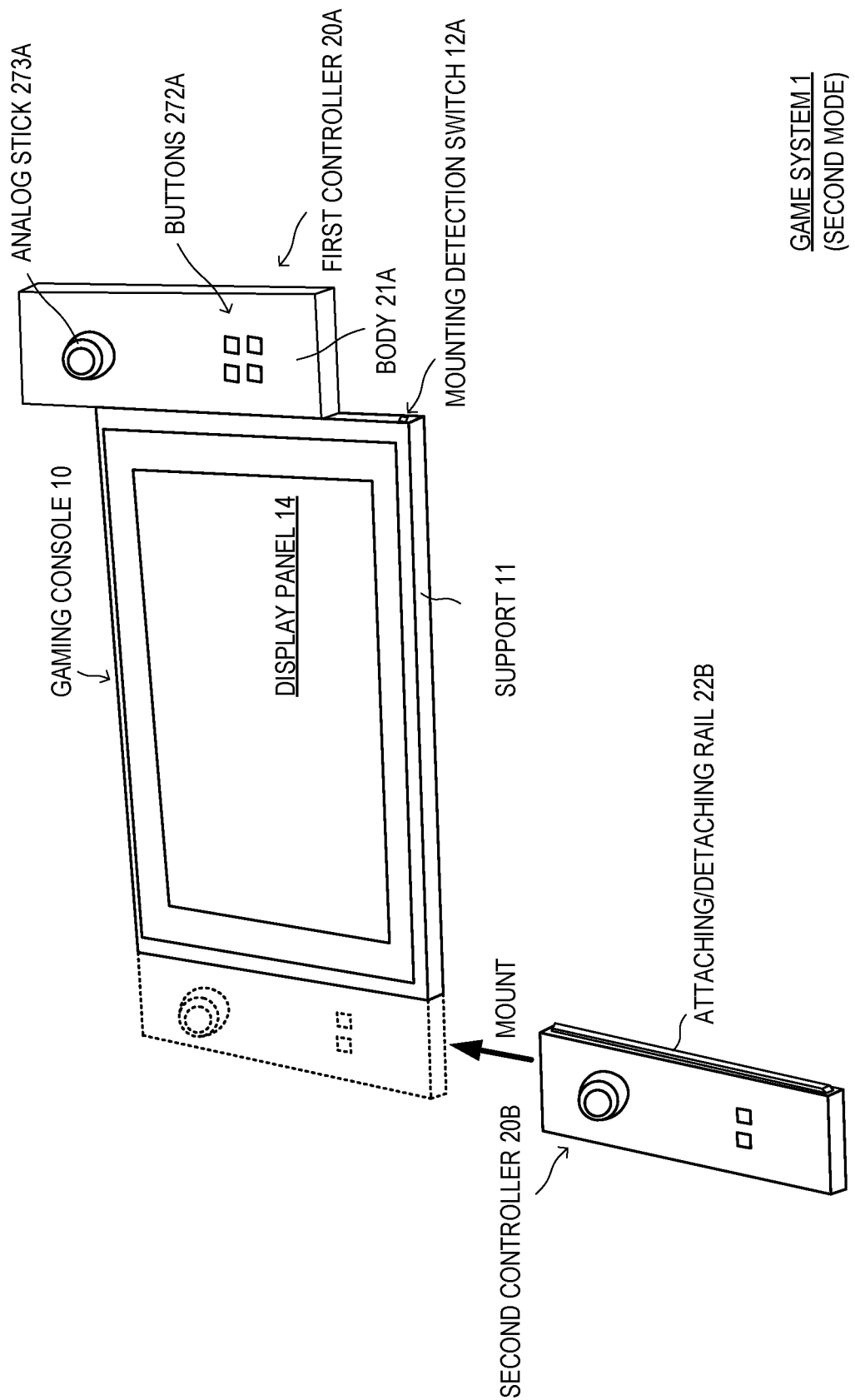
FIG. 2 is a diagram illustrating an example of an external appearance of a game system (a second mode) according to one embodiment of the invention.

As illustrated in FIGS. 1 and 2, the game system 1 has a gaming console 10 (a gaming console main body) as a game control device that performs game processing and the like and a first controller 20A and a second controller 20B as operation input devices which can be grasped by a player P with both hands and of which a position and an orientation are arbitrarily variable.

In addition, the game system 1 has a first mode in which the game system 1 is connected to a display 30 such as a monitor or a television set as illustrated in FIG. 1 and a second mode in which the controllers 20A and 20B are mounted to the gaming console 10 as illustrated in FIG. 2, and the game system 1 is configured such that a player can execute various games in each mode.

Furthermore, the game system 1 is configured so as to cause the display 30 to display a game image as an external output destination in the first mode and to output a game image to a display panel 14 (a display section 190 to be described later) formed at a center of the gaming console 10 in the second mode.

As illustrated in FIG. 1, the gaming console 10 is formed on a support 11 and is structured such that the first controller 20A and the second controller 20B are attachable/detachable to/from a side surface of the support 11.

Specifically, a guide rail (not illustrated) is formed on each side surface of the support 11 of the gaming console 10, and by having an attaching/detaching rail 22 formed on one side surface of each of the controllers 20A and 20B engage the guide rail, each of the controllers 20A and 20B becomes slidable. Accordingly, the gaming console 10 is configured such that the controllers 20A and 20B can be mounted and detached.

In addition, physical switches (hereinafter, also referred to as "mounting detection switches") 12A and 12B for respectively detecting mounted/unmounted states of the controllers 20A and 20B are formed on the side surface of the support 11 and, for example, when the controllers 20A and 20B are mounted to the gaming console 10, each of the mounting detection switches 12A and 12B outputs a signal (hereinafter, referred to as a "mounting signal") indicating the mounted state.

Furthermore, the gaming console 10 is configured such that, when the gaming console 10 is connected to a dock 40 for connecting to the external display 30, image display is switched from the display panel 14 to the display 30.

Each of the controllers 20A and 20B has the body 21, the attaching/detaching rail 22 which makes the controller 20A or 20B attachable/detachable to/from the gaming console 10, and an operation input section 270 having a plurality of buttons 272, an analog stick 273, and the like.

In addition, each of the controllers 20A and 20B is configured to provide a player with force feedback (hereinafter, referred to as "perceived vibration") to be perceived by the player in accordance with a game content that causes the body 21 to vibrate based on the mounted/unmounted state of the controller 20A or 20B with respect to the gaming console 10 and a given signal (hereinafter, referred to as a "force feedback signal") output from the gaming console 10.

It should be noted that, in the example illustrated in FIGS. 1 and 2, various types of information are transmitted and received by wireless communication between the gaming console 10 and each of the controllers 20A and 20B.

Furthermore, when mounted to the gaming console 10, each of the controllers 20A and 20B may be connected by a connector (not illustrated) as a connection for charging the controller 20A or 20B, electrically connected by other means, or connected to perform data communication.

2. Configuration of Game System

Figure 3:
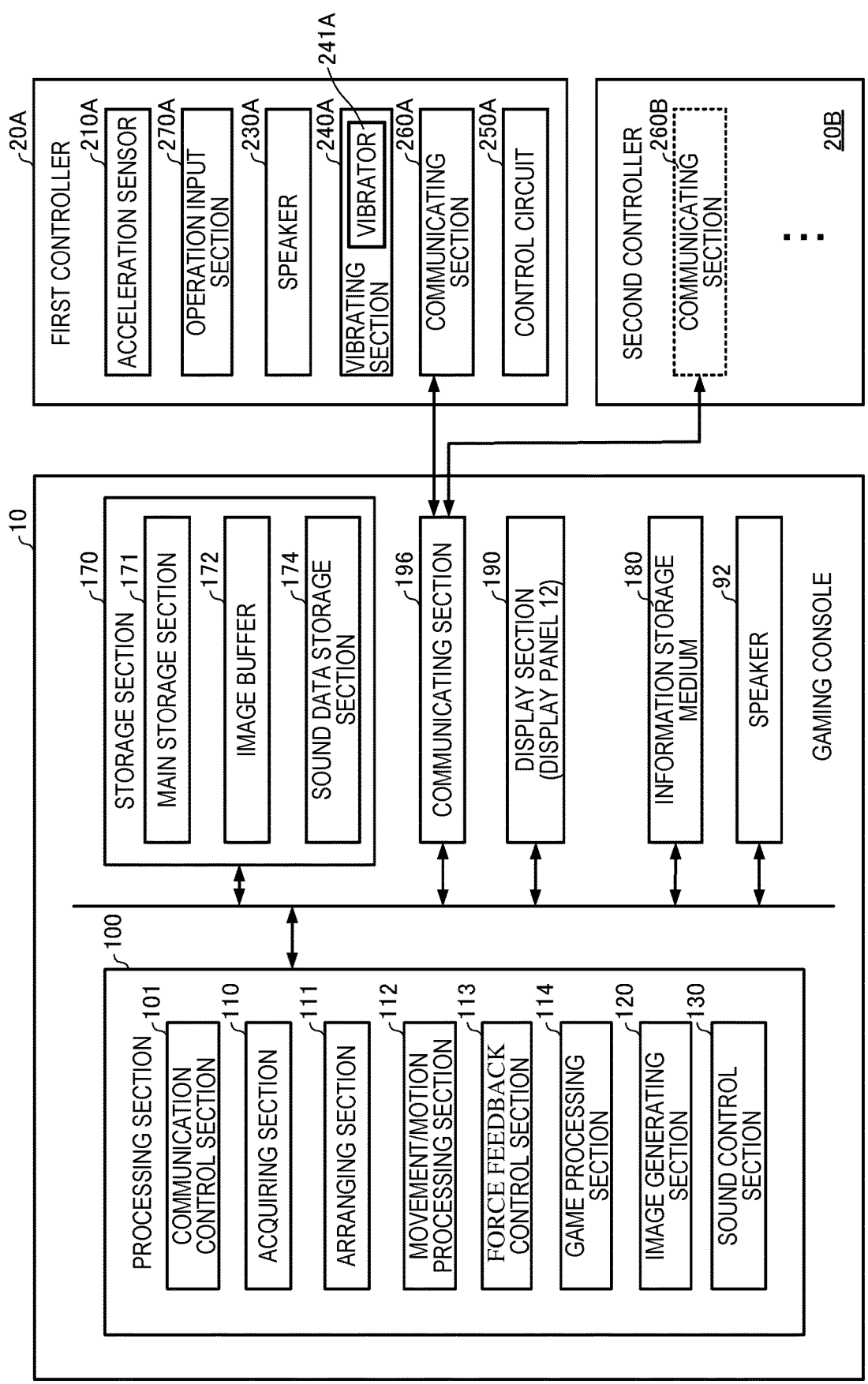
FIG. 3 is a diagram illustrating an example of functional blocks of a game system according to one embodiment of the invention.

Next, a configuration of the game system 1 constituted by the controllers 20A and 20B and the gaming console 10 will be described with reference to FIG. 3. It should be noted that FIG. 3 represents an example of a functional block diagram of the game system 1 including the controllers 20A and 20B and the gaming console 10. In addition, the game system 1 need not include all of the parts illustrated in FIG. 3 and may be configured so as to omit some of the parts. Furthermore, since the first controller 20A and the second controller 20B have the same basic functions, the controllers 20A and 20B are assumed to share the same configuration and will be described as the controller 20 unless specifically mentioned.

2-1. Controller

As described earlier, the controller 20 is constituted by the operation input section 270 having the plurality buttons 272, the analog stick 273, or the like, an acceleration sensor 210 as a physical sensor for detecting information that varies in accordance with an inclination or a motion of each controller 20, a speaker 230, a vibrating section 240 which feeds back perceived vibration to the player in accordance with contents of a game, a control circuit 250 which performs various control including vibration control of a vibrator in accordance with a mounted/unmounted state with respect to the gaming console 10, and a communicating section 260.

The acceleration sensor 210 detects acceleration of three axes (an X axis, a Y axis, and a Z axis). In other words, the acceleration sensor 210 is capable of detecting acceleration in an up-down direction (a Y-axis direction), a left-right direction (an X-axis direction), and a front-rear direction (a Z-axis direction). The acceleration sensor 210 detects acceleration every 5 msec (5 milliseconds). Alternatively, the acceleration sensor may detect acceleration of one axis, two axes, or six axes. It should be noted that the acceleration detected by the acceleration sensor is transmitted to the gaming console 10 by the communicating section 260.

For example, when the controller 20 is moved while being grasped, since an inclination and a motion of each of the controllers 20A and 20B vary, the acceleration sensor 210 detects an acceleration vector which varies in accordance with the inclination and the motion and wirelessly transmits the acceleration vector to the gaming console 10.

The gaming console 10 executes given processes based on the transmitted acceleration vector of each controller.

The speaker 230 outputs sound acquired from the gaming console 10 via the communicating section 260. In this embodiment, confirmation sounds and sound effects transmitted from the gaming console 10 are output.

Under the control of the control circuit 250, the vibrating section 240 receives a force feedback signal output from the gaming console 10 and operates based on the force feedback signal.

In particular, the vibrating section 240 receives a force feedback signal in accordance with a game output from the gaming console 10 under the control of the control circuit 250, and the vibrating section 240 has a vibrator 241 which vibrates the body of the controller 20A or 20B based on the received force feedback signal.

The vibrator 241 is a vibrator (a vibrator that enables variable amplitude) that realizes HD (high bandwidth and high definition) vibration (HD haptics) such as a piezoelectric actuator having a plurality of axes (vibration axes indicating a plurality of vibration directions such as front and rear, up and down, and left and right), and is configured to perform HD vibration by varying a vibration width, a vibration frequency, and a vibration pattern based on an input force feedback signal and the mounted/unmounted state of the controller 20 with respect to the gaming console 10.

A vibration axis of the vibrator 241 may be constituted by a single actuator or a plurality of actuators, and may be provided with a speaker unit capable of outputting vibration such as a woofer speaker unit and configured to change a member to be subjected to HD vibration by a sound signal or a force feedback control signal, or may be a combination of an actuator and a speaker unit.

The control circuit 250 is formed by, for example, a microcomputer, and performs control for outputting sound from the speaker 230 and operating the vibrating section 240 in accordance with received data from the gaming console 10.

In particular, the control circuit 250 performs control when executing processing for causing the acceleration sensor 210 having detected acceleration to transmit the acceleration to the gaming console 10 via the communicating section 260 and outputting a sound signal received via the communicating section 260 to the speaker 230.

In addition, the control circuit 250 executes vibration control of the vibrator 241 in accordance with a mounted/unmounted state indicating a state (hereinafter, referred to as a "mounted state") of being mounted to the gaming console 10 and a state (hereinafter, referred to as an "unmounted state") of being detached from the gaming console 10.

Specifically, the control circuit 250 has a drive circuit for driving the vibrator 241 that is an actuator, a speaker unit, or the like and a switching circuit which switches between a sound signal and a drive control signal as a drive signal of the vibrator 241 based on a signal (hereinafter, also referred to as a "mounted/unmounted state signal") indicating a mounted/unmounted state of the controllers 20A and 20B.

The communicating section 260 includes an antenna and a wireless module, and wirelessly transmits and receives data to and from the gaming console 10 using, for example, Bluetooth (registered trademark) technology.

Specifically, the communicating section 260 transmits acceleration detected by the acceleration sensor 210, data for force feedback control, sound data for sound output, and the like to the gaming console 10 at alternate intervals of 4 msec and 6 msec.

It should be noted that the communicating section 260 may be connected to the gaming console 10 by a communication cable and transmit and receive information via the communication cable or may transmit and receive information using a wireless device other than those based on Bluetooth (registered trademark).

In addition, the controller 20 may be provided with an operator such as arrow keys, a mouse, or a touch panel-type display in addition to the lever (the analog stick) 273 and the buttons 272. Furthermore, the controller 20 may be provided with a gyro sensor which detects an angular velocity to which the controller itself is subjected.

2-2. Gaming Console

The gaming console 10 is constituted by a storage section 170, a processing section 100, an information storage medium 180, a display section 190, a communicating section 196, and a speaker 92.

The storage section 170 serves as a work area for the processing section 100, the communicating section 196, and the like, and a function of the storage section 170 can be realized by hardware such as a RAM (VRAM).

In particular, the storage section 170 includes a main storage section 171, an image buffer 172, and a sound data storage section 174 that stores music data, sound effects, and the like. The image buffer 172 stores images generated in an image generating section 120.

The processing section 100 performs various processes in this embodiment based on a program stored in the information storage medium 180. In other words, the information storage medium 180 stores a program that causes a computer to function as each section (a program which causes a computer to execute processing of each section) of this embodiment.

The communicating section 196 can communicate with other gaming consoles via a network (the Internet). Functions of the communicating section 196 can be realized by hardware including various processors, a communication ASIC, and a network interface card, and by programs. In addition, the communicating section 196 can perform both wired and wireless communication.

Furthermore, the communicating section 196 includes an antenna and a wireless module, and transmits and receives data to and from the controller 20 via the communicating section 260 of the controller 20 using, for example, Bluetooth (registered trademark) technology.

For example, the communicating section 196 transmits sound data of confirmation sounds, sound effects, and the like and a force feedback signal to the controller 20, and the controller 20 receives information (such as an acceleration vector value) detected by the acceleration sensor or by an operation input at alternate intervals of 4 msec and 6 msec.

Alternatively, the program that causes a computer to function as each section of this embodiment may be distributed to the information storage medium 180 (or the storage section 170) via a network from a storage section or an information storage medium included in a server. The use of the information storage medium of such a server also falls within the scope of the invention.

The processing section 100 (a processor) performs game processing, an image generation process, or a sound control process based on information received from the controller 20, a program deployed from the information storage medium 180 to the storage section 170, or the like.

The processing section 100 performs a variety of game processing. Examples thereof include processing for starting a game when game start conditions are fulfilled, processing for advancing the game, processing for ending the game when game end conditions are fulfilled, and processing to cause an ending to proceed when a final stage is completed. In addition, the processing section 100 performs processing for reproducing music data stored in the sound data storage section 174.

Furthermore, the processing section 100 functions as a communication control section 101, an acquiring section 110, an arranging section 111, a movement/motion processing section 112, a force feedback control section 113, a game processing section 114, the image generating section 120, and a sound control section 130.

The communication control section 101 performs processing for transmitting and receiving data to and from the controllers 20A and 20B by wireless communication using the communicating section 196 or processing for transmitting and receiving data to and from other gaming consoles 10 via a network.

The acquiring section 110 performs processing for acquiring input information from the operation input section 270 (in other words, the controller 20). For example, the acquiring section 110 acquires a triaxial acceleration value detected by the acceleration sensor 210.

The arranging section 111 performs processing for arranging an object in a virtual space (a virtual three-dimensional space (an object space) or a virtual two-dimensional space). For example, the arranging section 111 performs processing for arranging, in the virtual space, display articles such as a building, a baseball field, a car, a tree, a column, a wall, and a map (a landscape) in addition to characters and designated objects. The virtual space in this case refers to a virtual game space and, for example, in the case of a virtual three-dimensional space, a space in which an object is arranged in three-dimensional coordinates (X, Y, Z) such as a world coordinate system or a virtual camera coordinate system.

For example, the arranging section 111 arranges an object (an object constituted by primitives such as a polygon, a free-form surface, and a subdivision surface) in a world coordinate system. In addition, for example, a position and an angle of rotation (synonymous with orientation and direction) of an object in a world coordinate system are determined, and the object is arranged at the position (X, Y, Z) at the angle of rotation (angles of rotation around the X, Y, and Z axes). Alternatively, the arranging section 111 may perform processing for arranging a scaled object in the virtual space.

The movement/motion processing section 112 computes movements and motions of an object in the virtual space. In other words, the movement/motion processing section 112 performs processing for moving the object in the virtual space or causing the object to make a move (motion, animation) based on input information, a program (a movement/motion algorithm), various data (motion data), and the like received from an input section. Specifically, processing is performed to sequentially obtain, for every frame (1/60 seconds), movement information (a speed of movement, an acceleration of movement, a position, an orientation, and the like) and motion information (a position or an angle of rotation of each part constituting the object) of the object. In this case, a frame is a unit of time when performing movement/motion processing of an object and an image generation process.

In addition, when moving an object in a virtual two-dimensional space, the movement/motion processing section 112 may perform control for moving the object (for example, an instruction mark) in a given direction of movement at a given speed of movement.

The force feedback control section 113 determines a mounted/unmounted state of the controllers 20A and 20B based on a mounting signal output from each of the mounting detection switches 12A and 12B, and in cooperation with each control circuit 250 of the controllers 20A and 20B, controls force feedback of each vibrator 241 in accordance with the mounted/unmounted state.

In particular, the force feedback control section 113 outputs a mounted/unmounted state signal indicating the determined mounted/unmounted state of the controllers 20A and 20B to the controllers 20A and 20B.

For example, when the controllers 20A and 20B are mounted to the gaming console 10, the force feedback control section 113 outputs the mounted/unmounted state signal, but when the controllers 20A and 20B are detached from the gaming console 10, the force feedback control section 113 does not output the mounted/unmounted state signal.

Alternatively, for example, when the controllers 20A and 20B are mounted to the gaming console 10, the force feedback control section 113 may output a first mounted/unmounted state signal, and when the controllers 20A and 20B are detached from the gaming console 10, the force feedback control section 113 may output a second mounted/unmounted state signal which differs from the first mounted/unmounted state signal.

Furthermore, the force feedback control section 113 generates, in accordance with game performance, a force feedback control signal which differs from a signal (hereinafter, also referred to as a "sound signal") of a game sound generated by the sound control section 130 in accordance with game performance, and transmits the generated force feedback control signal to the controllers 20A and 20B.

The force feedback control section 113 may provide the game processing section 114 with information on the mounted/unmounted state when necessary.

The game processing section 114 mainly executes the various game processing described above and performs a variety of processing for game computation related to the game.

The image generating section 120 performs an image drawing process based on results of various processes performed by the processing section 100 and, accordingly, generates an image and outputs the image to the display section 190 or the display 30.

In addition, the image generating section 120 receives input of object data (model data) including vertex data (positional coordinates, texture coordinates, color data, a normal vector, an α value, or the like of a vertex) of each vertex of an object (a model), and based on vertex data included in the input object data, performs vertex processing (shading by a vertex shader). When performing vertex processing, a vertex generation process (tesselation, curved surface division, or polygon division) for redividing a polygon may be performed if necessary.

In vertex processing, movement processing and geometry processing of a vertex including coordinate transformation such as world coordinate transformation, visual field transformation (camera coordinate transformation), a clipping process, perspective transformation (projection transformation), and viewport transformation are performed in accordance with a vertex processing program (a vertex shader program, a first shader program), and based on a processing result thereof, vertex data provided with respect to a group of vertices that constitute an object is changed (updated or adjusted).

In addition, rasterization (scan conversion) is performed based on vertex data after the vertex processing, and a surface of a polygon (a primitive) is associated with pixels. Following the rasterization, pixel processing (shading by a pixel shader, fragment processing) for drawing pixels constituting an image (fragments constituting a display screen) is performed. In pixel processing, various processing including texture reading (texture mapping), setting/changing of color data, translucent compositing, and anti-aliasing is performed in accordance with a pixel processing program (a pixel shader program, a second shader program) to determine a final drawing color of pixels constituting an image, and drawing colors of an object subjected to translucent composition is output (drawn) to the image buffer 172 (a buffer capable of storing image information in pixel units: a VRAM or a rendering target). In other words, in pixel processing, per-pixel processing is performed in which image information (a color, a normal, brightness, an α value, or the like) is set or changed in pixel units. Accordingly, an image viewed from a virtual camera (a given viewpoint) in an object space is generated. When a virtual camera (a viewpoint) exists in plurality, an image can be generated so that images viewed from the respective virtual cameras are displayed on one screen as divided images.

It should be noted that vertex processing and pixel processing are realized in accordance with shader programs described in a shading language by a so-called programmable shader (a vertex shader or a pixel shader) that is hardware which makes a drawing process of a polygon (a primitive) programmable. With a programmable shader, making processing in vertex units and processing in pixel units programmable increases a degree of freedom of contents of a drawing process and significantly improves expressiveness as compared to a static drawing process by conventional hardware.

In addition, when drawing an object, the image generating section 120 performs geometry processing, texture mapping, a hidden surface removal process, a blending, and the like.

In geometry processing, processing such as coordinate transformation, a clipping process, perspective projection transformation, or a light source calculation is performed. In addition, object data (a positional coordinate, a texture coordinate, color data (brightness data), a normal vector, an α value, or the like) of vertices of an object) after the geometry processing (after the perspective projection transformation) is stored in the storage section 170.

Texture mapping is processing for mapping a texture (a texel value) stored in the storage section 170 to an object. Specifically, using a texture coordinate or the like set (added) to a vertex of an object, a texture (surface properties such as a color (RGB) and an α value) is read from the storage section 170. Subsequently, the texture that is a two-dimensional image is mapped to the object. In this case, processing for associating pixels and texels with each other and bilinear interpolation or the like as interpolation of texels are performed.

As the hidden surface removal process, a hidden surface removal process according to Z-buffering (a depth comparison method, a Z test) using a Z-buffer (a depth buffer) in which a Z-value (depth information) of a drawing pixel is stored can be performed. In other words, when drawing a drawing pixel corresponding to a primitive of an object, a Z-value stored in the Z-buffer is referenced. The referenced Z-value of the Z-buffer and a Z-value in the drawing pixel of the primitive are compared with each other, and when the Z-value in the drawing pixel is a Z-value to the front as viewed from the virtual camera (for example, a smaller Z-value), a drawing process of the drawing pixel is performed and, at the same time, the Z-value of the Z-buffer is updated to a new Z-value.

α blending (α compositing) refers to a translucent compositing process (straight α blending, additive α blending, or subtractive α blending) based on an α value (an A value).

For example, in α blending, a linear compositing process based in the α value of a drawing color (a color to overwrite with) C1 to be drawn in the image buffer 172 and a drawing color (a basic color) C2 already drawn in the image buffer 172 is performed. In other words, when C denotes a final drawing color, C can be obtained according to $C=C1*\alpha+C2*(1-\alpha)$.

It should be noted that the α value is information that can be stored in association with each pixel (texel, dot) and is, for example, additional information other than color information. The α value can be used as mask information, translucency (equivalent to transparency and opacity), bump information, and the like.

The sound control section 130 performs sound processing based on results of various processes performed by the processing section 100, generates game sounds including a BGM, sound effects, and voices, and outputs the game sounds to the speaker 92.

In particular, the sound control section 130 transmits the generated game sound as a sound signal to the controllers 20A and 20B.

The gaming console 10 may be controlled so that a game can be played in a single player mode in which only one player can play or a multi-player mode in which a plurality of players can play. For example, when gaming consoles 10 are controlled in the multi-player mode, game processing may be performed by transmitting and receiving data to and from other gaming consoles 10 via a network or a single gaming console 10 may perform processing based on input information from a plurality of input sections.

The information storage medium 180 (a computer-readable medium) stores a program, data, and the like, and a function of the information storage medium 180 can be realized by hardware such as an optical disk (a CD or a DVD), a magneto-optical disk (MO), a magnetic disk, a hard disk, a magnetic tape, or a memory (a ROM).

The display section 190 is for outputting an image generated by the processing section 100 and a function thereof can be realized by hardware such as a CRT display, a liquid crystal display (LCD), an organic EL display (OELD), a plasma display panel (PDP), a touch panel-type display, or a head-mounted display (HMD).

The speaker 92 is for outputting sound to be reproduced by the sound control section 130 and a function thereof can be realized by hardware such as a plurality of speaker units or a headphone.

Alternatively, the speaker 92 may be formed as a speaker provided in the display 30. For example, when a television set (a home-use television receiver) is used as the display 30, a speaker of the television receiver can be used as the speaker 92.

3. Method 3-1. Overview

Next, a method according to one embodiment of the invention will be described.

The game system 1 is configured in order to execute various games while changing game control between a mounted state in which the first controller 20A and the second controller 20B are mounted to the gaming console 10 and an unmounted state in which the first controller 20A and the second controller 20B are detached from the gaming console 10.

In particular, when the body 21 is mounted to the support 11, the game system 1 must perform force feedback control with respect to the controllers 20A and 20B while taking into consideration generation of resonance based on force feedback of the gaming console 10 as well as devices such as the speaker 92 mounted to the gaming console 10 in addition to force feedback of the controllers 20A and 20B.

In consideration thereof, the game system 1 is configured to change control of perceived vibration to be fed back to a player via the first controller 20A and the second controller 20B between the mounted state and the unmounted state.

Specifically, in order to execute such perceived vibration control, the game system 1 includes: the gaming console 10 which has the support 11 and which controls the game; and the first controller 20A and the second controller 20B formed on the body 21 that is attachably/detachably mounted to the support 11.

In addition, each of the controllers 20A and 20B are provided with: the vibrator 241 which vibrates the body 21 based on a given signal; the attaching/detaching rail 242 for attachably/detachably mounting the body 21 to the support 11; and the control circuit 250 which controls vibration of the vibrator 241 in accordance with a detected mounted/unmounted state.

In particular, each vibrator 241 is a vibrator capable of HD vibration (HD haptics) and has a plurality of vibration axes including front and rear, upper and lower, and left and right vibration axes.

Furthermore, each of the controllers 20A and 20B is configured so as to be capable of controlling a vibration width, a vibration frequency, and a vibration pattern of each vibration axis of the vibrator 241 and feeding back various perceived sensations to a player.

In addition, the gaming console 10 is provided with the mounting detection switches 12A and 12B which detect a mounted/unmounted state indicating either a mounted state in which the body 21 is mounted to the support 11 or an unmounted state in which the body 21 is detached from the support 11.

According to this configuration, since the game system 1 can control the vibration pattern and the vibration width of the vibrator 241 in accordance with a mounted/unmounted state such as a mounted state or an unmounted state of the controllers 20A and 20B with respect to the gaming console 10, for example, when the controllers 20A and 20B are mounted to the gaming console 10, the vibration of the vibrator 241 can be adjusted such that (1) a vibration output thereof is reduced by making the vibration width smaller, making the vibration frequency lower, or using a vibration pattern with a smaller vibration width and a lower vibration frequency than when the controllers 20A and 20B are detached from the gaming console 10, or (2) performance related to perceived vibration to be perceived by the player is changed between when mounted to the gaming console 10 and when detached from the gaming console 10.

In other words, the game system 1 is configured so as to be capable of, when the body 21 is mounted to the support 11, controlling the vibration pattern, the vibration width, and the vibration frequency of the vibrator 241 in accordance with a mounted state and an unmounted state while taking into consideration the generation of resonance based on force feedback of the gaming console 10 as well as devices such as the speaker 92 mounted to the gaming console 10 in addition to force feedback of the controllers 20A and 20B.

Therefore, for example, the game system 1 is capable of:

(a) when mounted, reducing vibrations (for example, only vibration s at a target frequency) which cause resonance vibration of the support without limiting game performance;

(b) when unmounted, execute force feedback control that ignores the resonance vibration;

(c) when unmounted, realize force feedback control in accordance with a shape of only the body 21; and (d) when unmounted, realize force feedback control by adopting an operation method or a performance method of the game which differs from when mounted.

As a result, the game system 1 is capable of executing performance control in accordance with various situations during the execution of the game and, at the same time, since a failure based on force feedback can be prevented, the game system 1 is capable of improving comfortability of operations while enhancing interest of the user toward the game.

3-2. Principle of Force Feedback Control in Controller

Next, a principle of force feedback control in the controllers 20A and 20B will be described.

The control circuit 250 receives a mounted/unmounted signal (presence or absence thereof or a type) indicating a mounted/unmounted state of the controllers 20A and 20B with respect to the gaming console 10, a force feedback control signal transmitted from the gaming console 10, and a sound signal output in accordance with game performance, and controls the vibration width, the vibration frequency, and the vibration pattern in each vibration axis of the vibrator 241 based on given signals such as the received force feedback control signal, sound signal, and mounted/unmounted state signal.

In particular, the control circuit 250 uses the force feedback control signal to control the vibrator 241 in the mounted state in which the controllers 20A and 20B are mounted to the gaming console 10 but uses the sound signal to control the vibrator 241 in the unmounted state in which the controllers 20A and 20B are detached from the gaming console 10.

Specifically, based on the received mounted/unmounted state signal, the control circuit 250 selects a signal for controlling the vibrator 241 and outputs the selected signal to the vibrator 241.

For example, the control circuit 250 is configured to receive the mounted/unmounted state signal in the mounted state in which the controllers 20A and 20B are mounted to the gaming console 10 but configured not to receive the mounted/unmounted state signal in the unmounted state in which the controllers 20A and 20B are detached from the gaming console 10.

In addition, in the unmounted state, in order to provide the player with perceived vibration having a sense of unity with a sound signal generated in accordance with game performance (in other words, a sense of unity with game performance), the control circuit 250 vibrates the vibrator 241 based on, as the given signal, the sound signal (in other words, a sound signal of an entire frequency range).

On the other hand, in the mounted state, in order to prevent resonance and noise (for example, chattering noise) of the support and devices mounted thereto from being generated, the control circuit 250 controls vibration of the vibrator 241 based on, as the given signal, the received force feedback control signal which differs from the signal used in the unmounted state.

When an occurrence of a failure by mounting the controllers 20A and 20B to the gaming console 10 is expected and a frequency range (for example, lower than 100 kHz) included in a sound signal or a part (for example, a bass drum part) constituting a sound is recognized in advance, the control circuit 250 may use a sound signal of a predetermined frequency range (for example, 100 kHz or higher) instead of the force feedback control signal as the given signal in the mounted state, and the control circuit 250 may control vibration of the vibrator 241 based on the sound signal (for example, a sound signal excluding a sound signal of a bass drum part) of predetermined part constituting a sound.

Furthermore, at the start of a game, the gaming console 10 detects a mounted/unmounted state indicating either a mounted state in which the body 21 is mounted to the support 11 at the start of the game or an unmounted state in which the body 21 is detached from the support 11 at the start of the game based on the states of the mounting detection switches 12A and 12B, and as a result, when the mounted state is detected, the gaming console 10 outputs a mounted/unmounted state signal to the controllers 20A and 20B.

In addition, when only one of the first controller 20A and the second controller 20B is mounted, the force feedback control section 113 determines that the present state is the unmounted state and outputs the mounted/unmounted state signal to both controllers 20A and 20B. However, when only one of the first controller 20A and the second controller 20B is mounted, as the mounted state, the force feedback control section 113 may not output the mounted/unmounted state signal or may output the mounted/unmounted state signal to only the mounted controller 20.

In addition to the above, the force feedback control section 113 may cooperate with the game processing section 114 to output a sound signal and a force feedback control signal in accordance with performance to the respective controllers 20A and 20B (specifically, to each control circuit 250), and the game processing section 114 may change performance related to sound (for example, change sound performance so as to reduce bass) based on information on the mounted/unmounted state provided by the force feedback control section 113 and generate a sound signal related to the changed sound performance as a signal for controlling the vibrator 241 with the control circuit 250.

In this case, the force feedback control section 113 outputs a sound signal in accordance with the performance when mounted to the respective controllers 20A and 20B instead of the sound signal in accordance with the performance and the force feedback control signal when unmounted.

Figure 4:
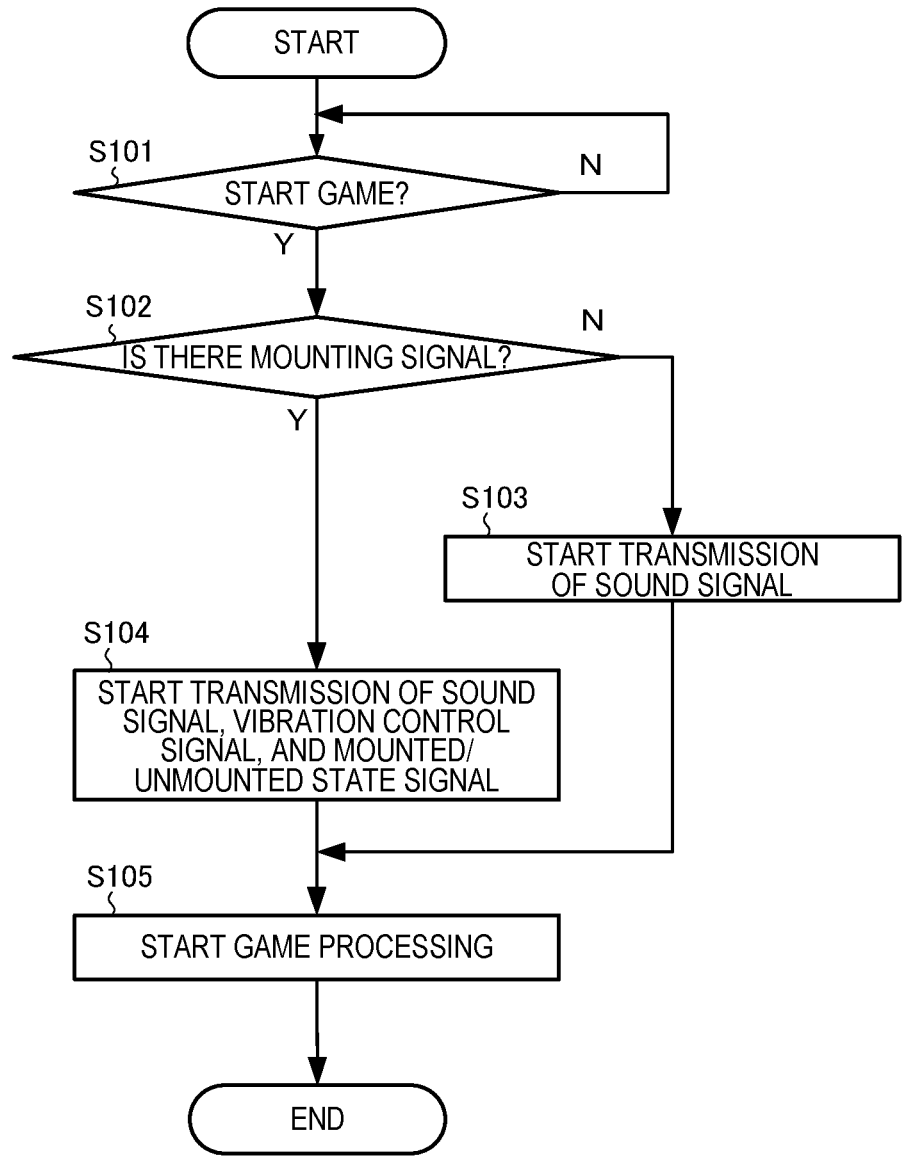
FIG. 4 is a flow chart illustrating operations of a game start process (of a gaming console) including force feedback control of a controller in a mounted/unmounted state according to one embodiment of the invention.
Figure 5:
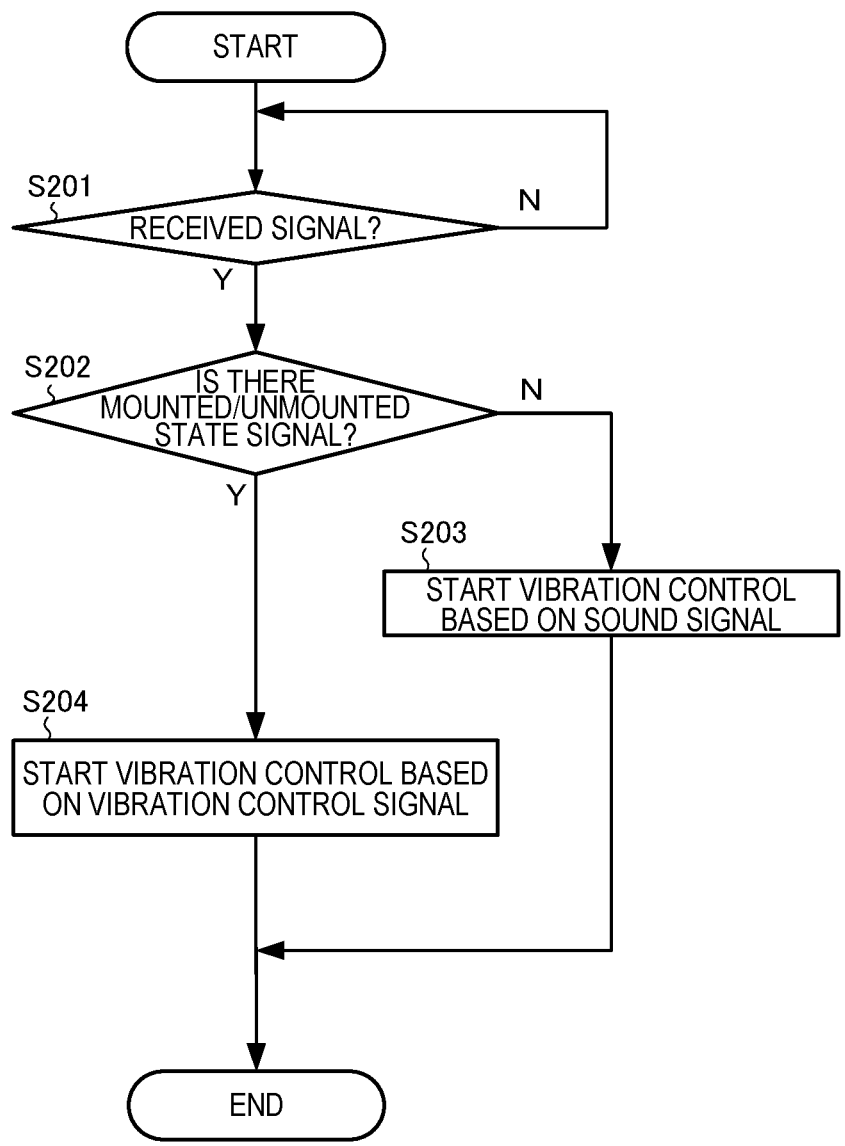
FIG. 5 is a flow chart illustrating operations of a game start process (of a controller) including force feedback control of a controller in a mounted/unmounted state according to one embodiment of the invention.

4. Game Start Process Including Force Feedback Control of Controller in Mounted/Unmounted State Next, a game start process including force feedback control of the controller in a mounted/unmounted state will be described with reference to FIGS. 4 and 5. FIGS. 4 and 5 are flow charts illustrating operations of a game start process including force feedback control of the controller in a mounted/unmounted state according to one embodiment of the invention.

The operations represent a process that is executed at the start of a predetermined game which is a process for setting force feedback control in each of the controllers 20A and 20B during the game.

In addition, in the operations, it is assumed that a mounted state is determined when both of the first controller 20A and the second controller 20B are mounted to the gaming console 10 and an unmounted state is determined when one of the controllers is unmounted.

Furthermore, in the operations, it is assumed that each of the controllers 20A and 20B vibrates the vibrator 241 based on a sound signal in the unmounted state and vibrates the vibrator 241 based on a force feedback control signal in the mounted state.

First, in the gaming console 10, when the game processing section 114 detects the start of a game (step S101), the force feedback control section 113 detects a presence or absence of a mounting signal from the mounting detection switches 12A and 12B (step S102).

At this point, when it is determined that a mounting signal is absent, the force feedback control section 113 determines that the controllers 20A and 20B are in the unmounted state and starts transmitting a sound signal to each of the controllers 20A and 20B (step S103), and makes a transition to the process of step S105.

When the force feedback control section 113 detects that one of the controllers 20 is mounted to the gaming console 10 in the process of step S103, the force feedback control section 113 determines that the mounted controller 20 is not used in the game and cancels the transmission of the sound signal.

On the other hand, when it is determined that the present state is a mounted state, the force feedback control section 113 starts transmitting a mounted/unmounted state signal together with a sound signal and a force feedback control signal to the first controller 20A and the second controller 20B (step S104), and makes a transition to the process of step S105.

Finally, the game processing section 114 starts game processing (step S105) and ends the operations.

On the other hand, in each of the controllers 20A and 20B, when the control circuit 250 detects a start of transmission of a signal transmitted from the gaming console 10 (step S201), the control circuit 250 determines whether or not a mounted/unmounted state signal is included in the transmitted signal (step S202).

At this point, when the control circuit 250 determines that a mounted/unmounted state signal is included in the signal transmitted from the gaming console 10, the control circuit 250 starts vibration control of the vibrator 241 based on the received sound signal (step S203), and ends the operations.

On the other hand, when the control circuit 250 determines that a mounted/unmounted state signal is not included in the signal transmitted from the gaming console 10, the control circuit 250 starts vibration control of the vibrator 241 based on the received force feedback control signal (step S203), and ends the operations.

Alternatively, when detecting a presence or absence of a mounting signal, a determination of whether or not there is consistency between the game to be executed and the mounting detection switches 12A and 12B may be made, and when there is no consistency, the display section 190 or the display 30 may be caused to perform a display prompting the player to mount or detach the controller 20 and prompt the player to confirm a mounted state of the controllers 20A and 20B.

For example, when the game to be started is premised on the first controller 20A being in an unmounted state, the force feedback control section 113 may determine that there is no consistency when the first controller 20A is mounted, prompt the player to unmount the first controller 20A, and control transmission of a signal such as a sound signal and control start of game processing once the first controller 20A has been unmounted.

5. Other 5-1. Display of Unmounted State

The gaming console 10 may cause the display section 190 or the display 30 to display whether the vibration control of the vibrator 241 is control of a mounted state in which the controllers 20A and 20B are mounted to the gaming console 10 or control of an unmounted state.

Specifically, the image generating section 120 may cooperate with the force feedback control section 113 to cause the display section 190 or the display 30 to display a mounted/unmounted state (in other words, either a mounted state or an unmounted state) determined based on a presence or absence of a mounting signal from the mounting detection switches 12A and 12B.

5-2. Determination of Mounted/Unmounted State Based on Communication

While the force feedback control section 113 determines the mounted/unmounted state of the controllers 20A and 20B based on the presence or absence of a mounting signal from the mounting detection switches 12A and 12B in the above embodiments, the mounted/unmounted state of the controllers 20A and 20B may be determined using an electric signal or an optical signal.

For example, the force feedback control section 113 may detect whether or not the controllers 20A and 20B are present at positions in contact with the gaming console 10 with the communicating section 196 using short-range wireless communication such as near-field communication (NFC) or may detect whether or not the controllers 20A and 20B are present at positions in contact with the gaming console 10 using infrared, visible light, or the like.

6. Modifications 6-1. First Modification

While a determination of a mounted/unmounted state including the mounting detection switches 12A and 12B and vibration control of the vibrator 241 are performed in the gaming console 10 in the above embodiments, the determination of a mounted/unmounted state including the mounting detection switches 12A and 12B and the vibration control of the vibrator 241 may be performed by the respective controllers 20A and 20B or by one of the controllers 20.

Specifically, for example, the respective controllers 20A and 20B may provide a physical switch similar to the mounting detection switch 12 on the attaching/detaching rail 22 or, as described above, detect a mounted/unmounted state using a detection device based on infrared, visible light, or the like provided on or in the vicinity of the attaching/detaching rail 22.

In addition, as described above, the respective controllers 20A and 20B may detect whether or not the controllers 20A and 20B are present at positions in contact with the gaming console 10 with the communicating section 260 using short-range wireless communication such as near field communication (NFC).

In this case, the control circuit 250 detects a mounted/unmounted state and, based on a detection result thereof, controls the vibrator 241 by switching a sound signal or a force feedback signal transmitted from the gaming console 10.

On the other hand, the respective controllers 20A and 20B may vibrate the vibrator 241 with the force feedback control section 113 instead of the control circuit 250.

In this case, the force feedback control section 113 may determine the mounted/unmounted state of the controllers 20A and 20B based on the mounting detection switches 12A and 12B provided on the gaming console 10 as in the above embodiments, or when the mounted/unmounted state of the controllers 20A and 20B is determined by the control circuit 250 as in this modification, the vibrator 241 may be controlled based on a result of the determination by feeding back the result of the determination to the gaming console 10.

6-2. Second Modification

Figure 6A:
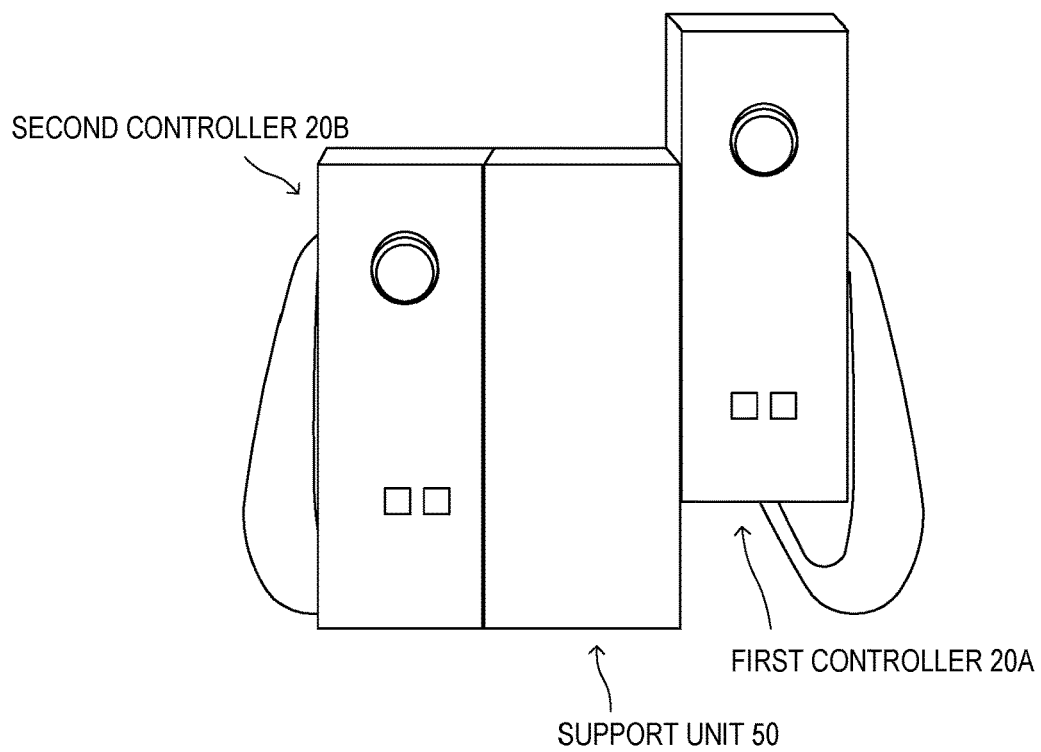
FIG. 6A is a diagram illustrating an example of an external appearance of a game system (a third mode) according to one embodiment of the invention.

While the controllers 20A and 20B are configured to be mounted to the gaming console 10 in the above embodiments, as illustrated in FIG. 6A, even when the controllers 20A and 20B are mounted to a support (hereinafter, also referred to as a "support unit") 50 such as a charging unit which is separate from the gaming console 10, control similar to when the controllers 20A and 20B are mounted to the gaming console 10 may be executed.

For example, in this case, the controllers 20A and 20B may provide a physical switch similar to the mounting detection switch 12 on the attaching/detaching rail 22 in a similar manner to the case described in the first modification, and the control circuit 250 may detect a mounted/unmounted state and, based on a detection result thereof, control the vibrator 241 by switching a sound signal or a force feedback signal transmitted from the gaming console 10.

In addition, the support unit 50 has a rail similar to the guide rail in the above embodiments, a physical switch similar to the mounting detection switch 12 is provided on the rail, and a mounting signal detected by the switch is transmitted to the gaming console 10 when a mounted/unmounted state is to be determined by the gaming console 10 but transmitted to the controllers 20A and 20B when a mounted/unmounted state is to be determined by the controllers 20A and 20B.

Alternatively, instead of the configuration described above, the support unit 50 may include the force feedback control section 113 or the control circuit 250 for determining a mounted/unmounted state, or both of the force feedback control section 113 and the control circuit 250.

It should be noted that FIG. 6A is a diagram illustrating a schematic appearance of the game system 1 (a third mode).

6-3. Third Modification

Figure 6B:
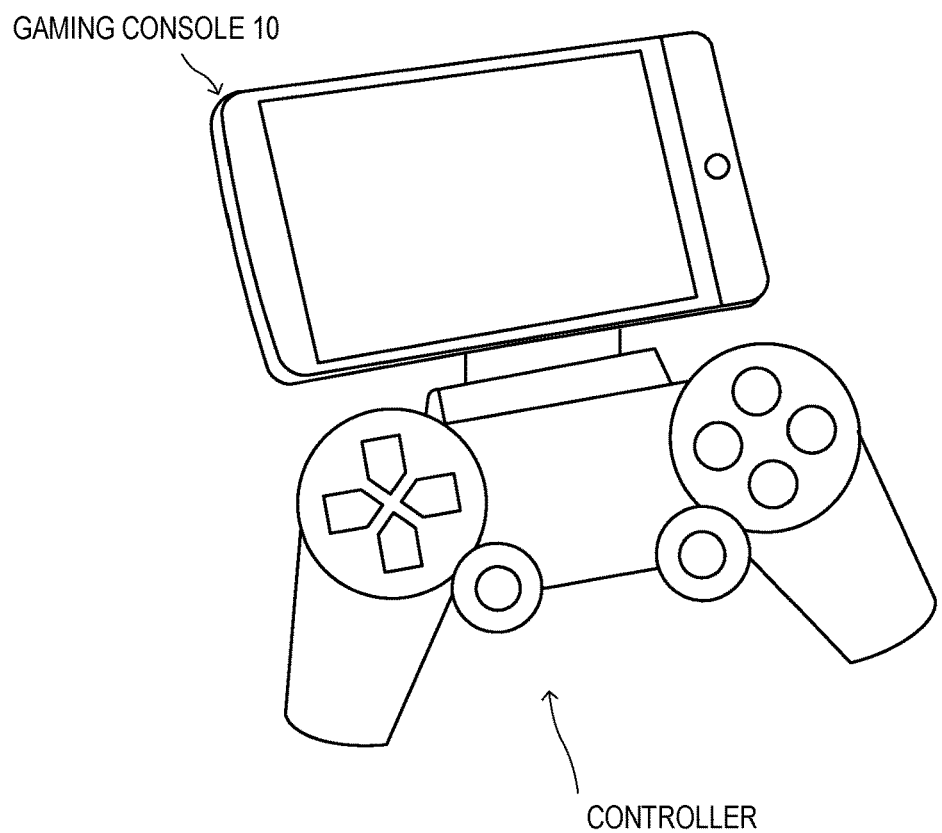
FIG. 6B is a diagram illustrating another example of an external appearance of a game system according to one embodiment of the invention.

While two separate left and right controllers 20A and 20B are used as operation input devices in the above embodiments, as illustrated in FIG. 6B, a single controller 20C may be used in which left and right operating sections are formed in a single body.

For example, in this case, since an information terminal device such as a smart phone can be used as the gaming console 10, a game can be readily executed.

It should be noted that FIG. 6B is a diagram illustrating another example of a schematic appearance of the game system 1.

The invention is not limited to the embodiments described above and various modifications can be made thereto. For example, a term quoted as a broad term or a synonymous term in the specification or in the drawings may be replaced with a broad term or a synonymous term in the specification or in other descriptions of the drawings.

Examples of games in which the embodiments of the invention are usable include match-up games such as a baseball game, a soccer game, a basketball game, and other sport games, roll playing games (RPG), and other simulation games.

The invention includes configurations which are substantially the same as the configurations described in the embodiments (for example, a configuration of which a function, a method, and a result are the same or a configuration of which an objective and an effect are the same). In addition, the invention includes configurations in which nonessential portions of the configurations described in the embodiments have been replaced. Furthermore, the invention includes configurations which produce the same effects or configurations capable of achieving the same objective as the configurations described in the embodiments. Moreover, the invention includes configurations in which known art is added to the configurations described in the embodiments.

Some embodiments of the invention have been described in detail above, but those skilled in the art would readily appreciate that many modifications are possible in the embodiments without materially departing from the novel teachings and effects of the invention. Accordingly, all such modifications are intended to be included within the scope of the invention.

What is claimed is:

1. An operation input system for use in a game, the operation input system comprising:
  a body attachably/detachably mounted to a support;
  a vibrator that vibrates the body based on a given signal;
  an attachment that attachably/detachably mounts the body to the support; and
  a controller that controls vibration of the vibrator in accordance with a mounted/unmounted state indicating either: (A) a mounted state in which the body is mounted to the support, or (B) an unmounted state in which the body is detached from the support, wherein:
    in the case of the unmounted state, the controller controls vibration of the vibrator based on, as the given signal, a sound signal of a frequency range, and
    in the case of the mounted state, the controller controls vibration of the vibrator based on, as the given signal, a control signal that differs from the sound signal in the case of the unmounted state thereby reducing a resonance vibration in the operation input system.

2. The operation input system according to claim 1, wherein
  in the case of the mounted state, the controller controls vibration of the vibrator based on, as the given signal, a force feedback control signal that differs from a signal used in the case of the unmounted state.

3. The operation input system according to claim 1, wherein
  the controller controls vibration of the vibrator based on, as the given signal, a sound signal of a predetermined frequency range that differs from a signal used in the case of the unmounted state, or a sound signal of a predetermined part constituting a sound.

4. The operation input system according to claim 1, wherein the given signal includes a force feedback control signal.

5. An operation input device for use in a game, the operation input device comprising:
  a body attachably/detachably mounted to a support;
  a vibrator that vibrates the body based on a given signal; and
  an attachment that attachably/detachably mounts the body to the support, wherein:
    the vibrator is controlled in accordance with a mounted/unmounted state indicating either: (A) a mounted state in which the body is mounted to the support, or (B) an unmounted state in which the body is detached from the support,
    in the case of the unmounted state, the controller controls vibration of the vibrator based on, as the given signal, a sound signal of a frequency range, and
    in the case of the mounted state, the controller controls vibration of the vibrator based on, as the given signal, a control signal that differs from the sound signal in the case of the unmounted state thereby reducing a resonance vibration in the operation input system.

6. The operation input device according to claim 5, wherein the given signal includes a force feedback control signal.

7. A game system comprising:
  a game control device that is formed on a support and controls a game; and
  an operation input device formed on a body that is attachably/detachably mounted to the support, the operation input device including: (i) a vibrator that vibrates the body based on a given signal; and (ii) an attachment that attachably/detachably mounts the body to the support, wherein:
  either the game control device or the operation input device is provided with:
    a detector that detects a mounted/unmounted state indicating either: (A) a mounted state in which the body is mounted to the support, or (B) an unmounted state in which the body is detached from the support; and
    a controller that controls vibration of the vibrator in accordance with the detected mounted/unmounted state,
  in the case of the unmounted state, the controller controls vibration of the vibrator based on, as the given signal, a sound signal of a frequency range, and
  in the case of the mounted state, the controller controls vibration of the vibrator based on, as the given signal, a control signal that differs from the sound signal in the case of the unmounted state thereby reducing a resonance vibration in the operation input system.

8. The game system according to claim 7, wherein
  the detector is a physical switch which is formed in at least one of the support and the body and which detects the mounted/unmounted state.

9. The game system according to claim 8, wherein
  the detector electrically detects the mounted/unmounted state.

10. The game system according to claim 8, further comprising
  a display controller that causes display to display whether control of vibration of the vibrator is control in the mounted state or control in the unmounted state.

11. The game system according to claim 7, wherein
  the detector electrically detects the mounted/unmounted state.

12. The game system according to claim 7, further comprising
  a display controller that causes display to display whether control of vibration of the vibrator is control in the mounted state or control in the unmounted state.

13. The game system according to claim 7, wherein the given signal includes a force feedback control signal.

14. A game system comprising:
  a support;
  a game control device that controls a game; and
  an operation input device formed on a body that is attachably/detachably mounted to the support, the operation input device including: (i) a vibrator that vibrates the body based on a given signal; and (ii) an attachment that attachably/detachably mounts the body to the support, wherein:

one of the support, the game control device, and the operation input device is provided with:
- a detector that detects a mounted/unmounted state indicating either: (A) a mounted state in which the body is mounted to the support or (B) an unmounted state in which the body is detached from the support; and
- a controller that controls vibration of the vibrator in accordance with the detected mounted/unmounted state, in the case of the unmounted state, the controller controls vibration of the vibrator based on, as the given signal, a sound signal of a frequency range, and in the case of the mounted state, the controller controls vibration of the vibrator based on, as the given signal, a control signal that differs from the sound signal in the case of the unmounted state thereby reducing a resonance vibration in the operation input system.

15. The game system according to claim 14, wherein the detector is a physical switch which is formed in at least one of the support and the body and which detects the mounted/unmounted state.

16. The game system according to claim 15, wherein the detector electrically detects the mounted/unmounted state.

17. The game system according to claim 15, further comprising
- a display controller that causes display to display whether control of vibration of the vibrator is control in the mounted state or control in the unmounted state.

18. The game system according to claim 14, wherein the detector electrically detects the mounted/unmounted state.

19. The game system according to claim 14, further comprising
- a display controller that causes display to display whether control of vibration of the vibrator is control in the mounted state or control in the unmounted state.

20. The game system according to claim 14, the given signal includes a force feedback control signal.

* * * * *